United States Patent [19]

Boddy

[11] Patent Number: 5,359,866
[45] Date of Patent: Nov. 1, 1994

[54] LATCHING HOLDER

[76] Inventor: Roy N. Boddy, Manor Farm, Chinnor Hill, Chinnor, Oxon OX9 4BG, England

[21] Appl. No.: 685

[22] Filed: Jan. 5, 1993

[30] Foreign Application Priority Data

Jan. 11, 1992 [GB] United Kingdom ............ 9200548.7

[51] Int. Cl.$^5$ .......................................... F16B 41/00
[52] U.S. Cl. ........................................ 70/18; 70/232; 24/270; 285/409
[58] Field of Search ............................ 70/18, 229–232; 285/373, 409; 24/270, 273, 274 P, 530

[56] References Cited

U.S. PATENT DOCUMENTS

| | | | |
|---|---|---|---|
| 1,718,270 | 6/1929 | Wyman | 70/229 |
| 2,656,706 | 10/1953 | Lucas et al. | 70/232 |
| 2,994,551 | 8/1961 | Garnett, Jr. | |
| 3,245,240 | 4/1966 | De Forrest | 70/232 X |
| 3,269,159 | 8/1966 | Young | 70/232 |
| 3,284,121 | 11/1966 | Lyon | 70/232 X |
| 3,380,267 | 4/1968 | Winchester | 70/232 |
| 3,832,872 | 9/1974 | Gerlach | 70/232 |
| 3,982,413 | 9/1976 | Stone et al. | 70/229 |
| 4,114,409 | 9/1978 | Scire | 70/230 X |
| 4,639,979 | 2/1987 | Polson | |
| 4,777,811 | 10/1988 | Binkley et al. | 70/232 X |
| 5,033,280 | 7/1991 | Johnson | 70/232 |

FOREIGN PATENT DOCUMENTS

| | | | |
|---|---|---|---|
| 652751 | 3/1929 | France | 70/232 |
| 2270472 | 5/1975 | France | |
| 3237627 | 12/1984 | Germany | |
| 532379 | 8/1955 | Italy | 70/232 |
| 1372745 | 11/1974 | United Kingdom | 70/229 |
| 2161535 | 1/1986 | United Kingdom | |

*Primary Examiner*—Peter M. Cuomo
*Assistant Examiner*—Suzanne L. Dino
*Attorney, Agent, or Firm*—Watson, Cole, Grindle & Watson

[57] ABSTRACT

A latching holder for engaging an article comprises first and second co-acting members (1,2) which define a recess (8) for receiving an article. The members (1,2) are pivotally engaged together on one side of the recess (8). The first and second members have releasable co-acting cam means (11,29) on the opposite side of the recess, the cam means being operated to lock the first and second co-acting members together. A locking arm (20) is preferably used to operate the cam means. The holder has particular utility in holding the RF (radio frequency) aerial of a helicopter to the tail boom.

13 Claims, 4 Drawing Sheets

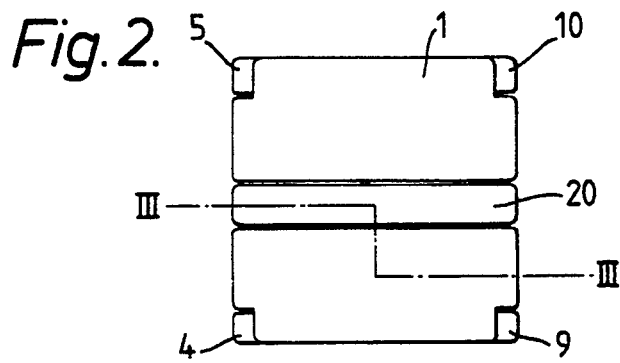
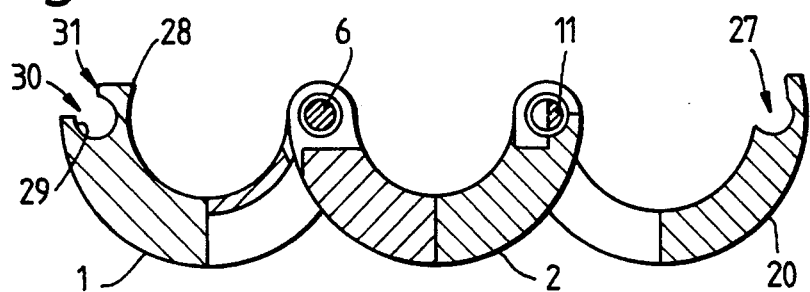
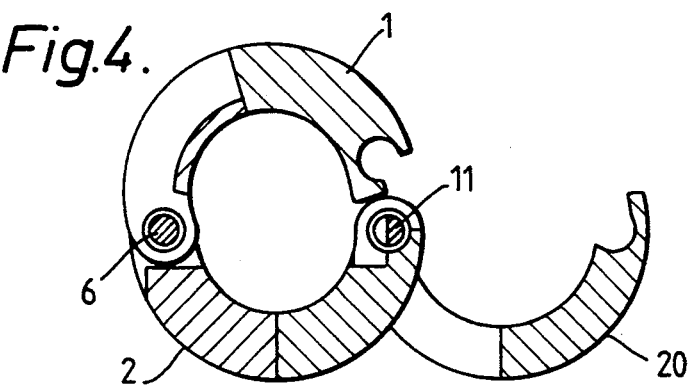
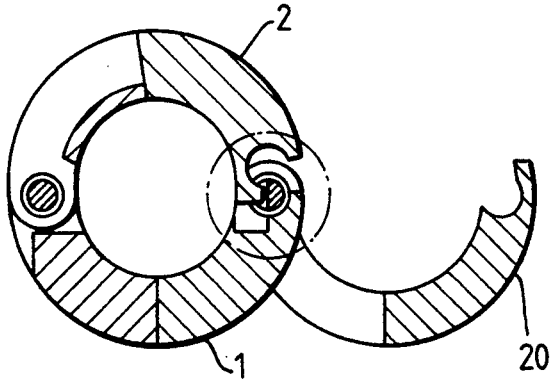
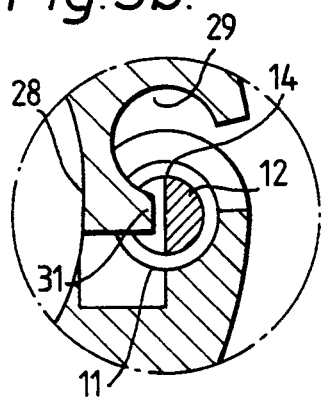

LATCHING HOLDER

The present invention relates to a latching holder for holding an article.

There are many circumstances in which it is necessary to form a clamping engagement with an article, particularly an article which is elongate. For example, U.S. Pat. No. 2,994,551 discloses a boring bar mover which includes a pair of part-cylindrical clamp members which are pivotally coupled together at one side. On the opposite side of the clamp members, one clamp member is provided with a hook which is engaged by an eye member associated with the other clamp member. The eye member is attached via a cable to an over-centre lever, enabling the clamp members to be drawn and locked together.

According to a first aspect of the present invention the present invention, there is provided a latching holder for engaging an article, the holder comprising: first and second co-acting members which define a recess for receiving an article, the members being pivotally engaged on one side of the recess; and, releasable rotatable cam means on the opposite side of the recess, the cam means being operable to lock the first and second co-acting members together.

In a preferred arrangement, the cam means comprises a cam member having a convex part-circular cam surface, which is rotatable about its axis and is mounted on the second member, and a recess on the first member having a corresponding concave part-circular cam surface for receiving the cam member.

The rotatable cam means may be rotated by a locking arm pivotally mounted on one of the co-acting members. The holder preferably includes locking means for locking the locking arm in its locked position.

The cam means may alternatively be operated by any conventional means such as a tumbler operated by a key. Where the cam means includes a rotatable cam member as described above, the rotatable cam member may include a recess for receiving the blade of a screwdriver or an Allen-type key.

The holder and recess may be elongate for receiving an elongate article. The recess may have a circular cross-section for receiving a tubular article. Alternatively, the recess may have an elliptical shape, which can grip a tubular article.

The recess may have longitudinal ridges. Alternatively or additionally, the recess may have a liner, for example a PTFE sleeve.

The latching holder of the present invention has particular utility in holding the RF (radio frequency) aerial of a helicopter. These aerials are rigid elongate rods of about 3 cm diameter and are mounted externally of the tail boom of the helicopter. As daily inspection of parts within the tail boom is often essential, the whole RF aerial has to be removed to gain access to those parts. A number of latching holders of the present invention can be fixed along the length of the tail boom and can be locked and released to hold the aerial very securely; in the embodiment of the invention intended for this purpose, no tools are required to lock or unlock the holder.

The holder has many other uses. For example, the holder can be used to releasably hold gun sights on rifles. A pair of holders can be fixed or formed integrally "back-to-back" and can be used to connect together two or more articles, such as barriers, scaffolding, fire hoses, or the like.

According to a second aspect of the present invention, there is provided a clamp device for engaging a pipe or other elongate element, comprising first and second co-acting members which define a recess for receiving the elongate element, the said members being pivotally engaged together on one side of the recess and, on the opposite side of the recess, the second clamp member is provided with a locking lever movable from an open position to a locking position, in which the locking lever is coupled to a cam member arranged such that, on such movement of the lever, the cam member moves into locking engagement with the first clamp member.

An example of the present invention will now be described with reference to the accompanying drawings, in which:

FIG. 2 is a plan view of the assembled holder;

FIGS. 3 to 4, 5A, 6A, 7A, 8A and 9A are sections on line III—III of FIG. 2, showing the holder in various stages between open and locked positions, including some inset details in FIGS. 5B, 6B, 7B, 8B and 9B; and, FIGS. 10A to 10C are respectively a lateral cross-sectional view and longitudinal cross-sectional views of holders provided internally with ribs.

Figure 1:
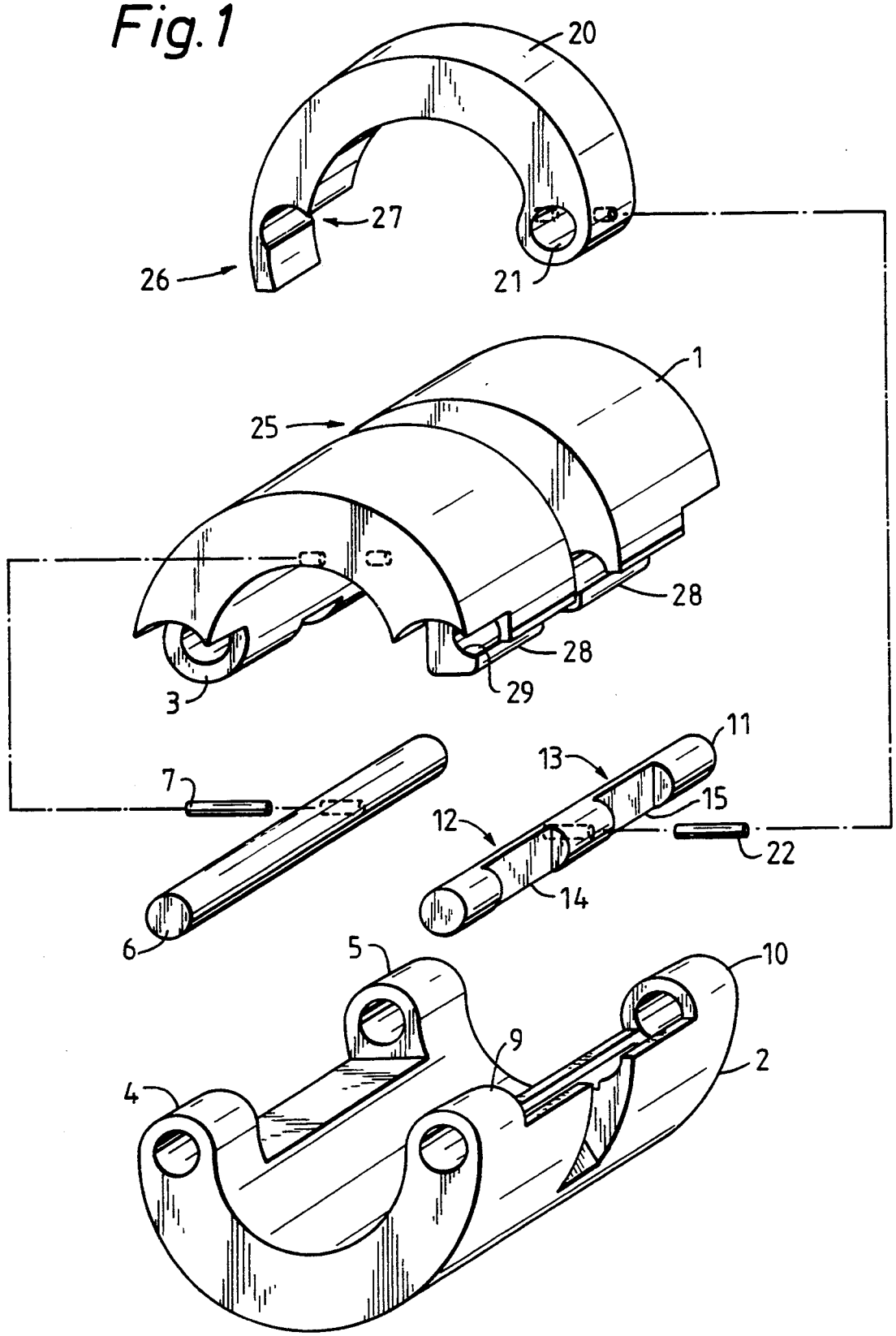
FIG. 1 is an exploded perspective view of a latching holder of the invention.
Figure 6A:
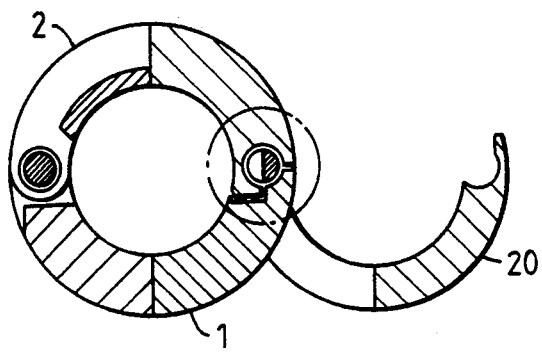
Figure 6B:
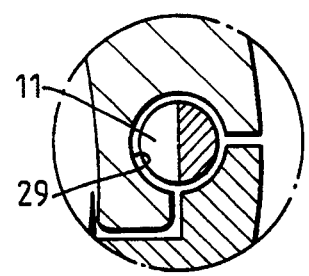

Referring firstly to FIGS. 1 and 2, the holder comprises first and second generally hemi-cylindrical clamp members 1 and 2 respectively. One axial edge of the first clamp member 1 has a tubular projection 3 which, in the assembled holder, is axially received between a pair of spaced tubular projections 4, 5 provided on the corresponding edge of the second clamp member 2. A pivot pin 6 is inserted through the three projections 3, 4, 5 with its axis parallel to that of the clamp members 1 and 2. A peg 7 is tightly inserted through the projection 3 and pivot pin 6 in order to hold the pivot pin 6 in place. The pivot pin 6 is free to rotate in the projections 4, 5 on the second clamp member 2 so that the two clamp members 1 and 2 are pivotally coupled by the pivot pin 6.

When the two clamp members 1 and 2 are pivotally moved to a conjoined position, they together define a generally cylindrical recess 8 (FIGS. 9A-9B) for receiving a pipe or similar elongate element (not shown). The recess 8 may have a circular cross-section or another shape, such as elliptical which may be useful in some circumstances to compress and thus better grip the article to be held.

The axial edge of the second clamp member 2 opposite the pivot edge also has a pair of spaced tubular projections 9, 10 which, in the assembled holder, rotatably receive a locking pin 11. The locking pin 11 is cut away at two axially spaced positions to form two semicircular cam surfaces 12, 13 each having a respective leading edge 14, 15. In the example shown, the portions cut away from the locking pin 11 are strictly semicircular. However, the portions cut away could be along a chord of the circular cross-section of the locking pin 11 or a sector to leave a V-shape valley running axially of the locking pin 11 over the cut-away portions.

A part-circular locking arm 20 is secured to the locking pin 11 between the cam surfaces 12, 13 to enable the locking pin 11 to be rotated. One end of the locking arm 20 has an aperture 21 which receives the locking pin 11, and the arm is fixed to the locking pin by a peg 22 which is tightly inserted through the locking pin 11 and arm 20. The external surface of the first clamp member 1 has a recess 25 which receives the locking arm 20 so that it can be stowed flush with the external surface of the clamp member when in a locking position. In addition, the free end 26 of the locking arm is shaped by having a circular recess 27 to snap-engage over the outer surface of the pivot pin 6, thus positively retaining the locking arm 20 in the locking position.

The axial edge of the first clamp member 1 which cooperates with the locking pin 11 has a pair of axially spaced locking projections 28 which, as seen for example in the FIG. 3, define part-cylindrical recesses 29 of the same diameter as the locking pin 11. Each projection 28 has an open mouth 30, one axial edge of which forms a nose 31 at the leading end of the projection 28.

Figure 9A:
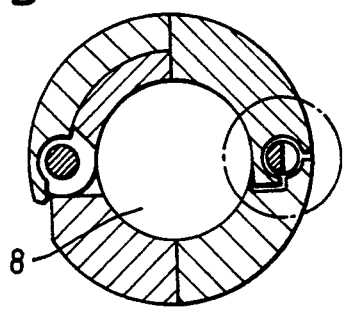
Figure 9B:
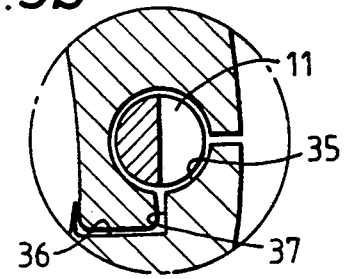

As shown in FIGS. 9A-9B, in the region between the projections 9, 10, the edge of the second clamp member 2 is profiled to complement the opposed edge of the first clamp member 1. In particular, a concave portion 35 completes the circle which is partially formed by the recess 29, and the concave portion leads via an upstand 37 into a groove 36 which receives the locking projections 28.

When the locking arm 20 is in an open, projecting position (FIG. 3), the clamp members 1 and 2 can be pivotally opened and engaged about a pipe for example (FIG. 4). As the free edges of the clamp members 1, 2 are brought together, the noses 31 of the locking projections 28 move past the respective leading edges 14, 15 of the cam surfaces 12, 13 and, provided that there is no resistance from the pipe to be held, the locking pin 11 passes through the mouths 30 into the recesses 29.

Figure 7A:
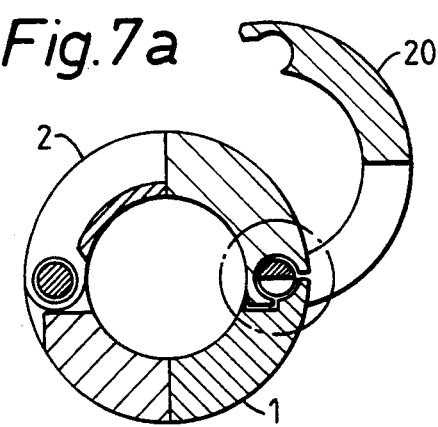
Figure 7B:
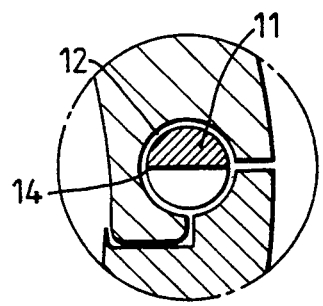
Figure 8A:
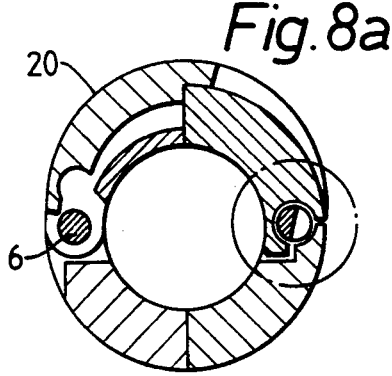
Figure 8B:
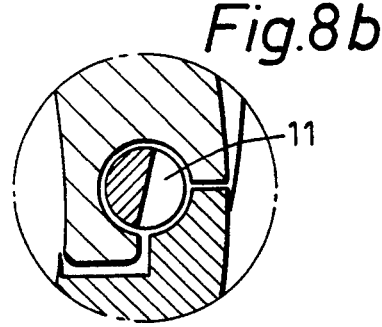

In most cases however, in order to provide firm engagement with the pipe, the clamp members 1, 2 are of such a size that they must be urged into clamping engagement with the pipe. In such conditions, the clamp members 1, 2 are still partially open as shown in FIGS. 5A-5B so that the noses 31 are still opposed to the cam surfaces semi-circular portions of the locking pin 11. However, by rotating the locking arm 20 towards the closed or locked position, the leading edges 14, 15 of the cam surfaces 12, 13 can be moved into engagement with the back of the recesses 29. Further rotation of the locking lever 20 towards the locked position drives the cam surfaces 12, 13 around the recesses 29 with a cam action so that the locking pin 11 rolls into the recesses 29, as shown in FIGS. 7 and 8, drawing the clamp members 1, 2 together.

When the locking arm 20 finally snap engages with the pivot pin 6 in its recess 25 (FIGS. 8A-8B), the locking pin 11 has rotated through a full 180° (or substantially so) to lie snugly within the recesses 29 and the locking pin 11 thereby locks the clamp members 1, 2 together. It should be noted that since the locking projections 28 have engaged in the groove 36, they are unable to deform radially inwards under load due to their abutment with the upstand 37. The device can be released from the pipe by a reverse process.

The latching holder has many uses. For example, the recess 8 could be provided with seals and a projection for puncturing a pipe in order to couple a branch pipe, joined to one of the clamp members, to the main pipe. The article to be held may be provided with an annular rib which engages in an annular groove provided internally of the recess 8. The elongate element to be held need not necessarily be circular, but if it is, the recess 8 may be slightly non-circular to provide a better grip.

By use of the locking arm 20, it is very apparent when the holder has been securely latched as the arm 20 will project if not fully snap-engaged with the pivot pin 6.

The arm 20 is relatively light and thus the risk of it becoming detached from engagement with the pivot pin 6 due to vibration, for example, is minimal. Furthermore, even if the locking arm 20 does become detached from the pivot pin 6, long travel of the arm 20 is required to rotate the locking pin 11 fully out of engagement with the recesses 29, providing more security. Nevertheless, the locking arm 20 can have a small hole at its free end which can be used to wire the arm 20 to a projection having a similar hole (not shown) on the second clamp member 2 adjacent the pivot pin 6.

The locking arm could be shorter and may be positively locked in the closed position by any convenient means or combination of means.

Instead of providing a locking arm to rotate the locking pin, the locking pin 11 could be operated by means of a key to prevent unauthorised removal of the article being held by the latching holder. Use of a locking arm 20 does however mean that no tools are required to release the article being held.

Figure 10A:
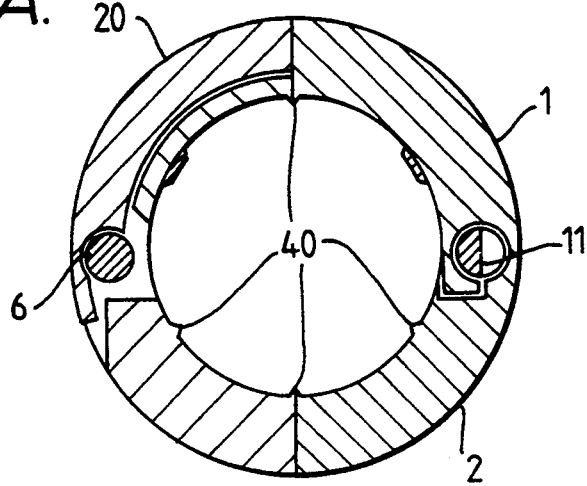
Figure 10B:
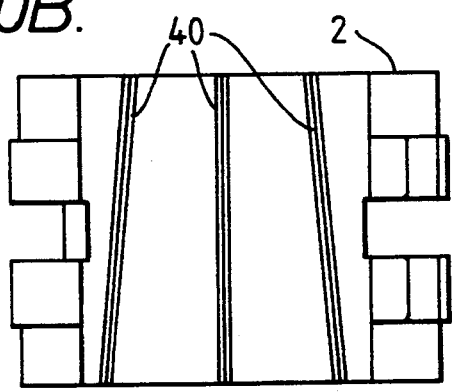
Figure 10C:
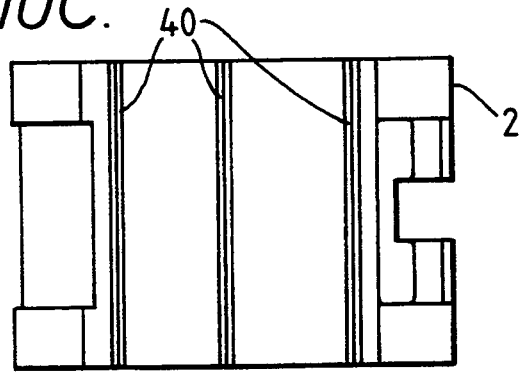

One or both of the clamp members 1, 2 may have one or more ribs 40 which project into the recess 8 as shown in FIGS. 10A to 10C. The ribs may be parallel to the longitudinal axis of the holder (FIG. 10B) or generally parallel or at an acute angle to the longitudinal axis of the holder (FIG. 10C) and can "bite" into the article to be held to provide better grip.

The clamp members 1, 2 and locking arm 20 maybe made of dull-anodised aluminium for good weather protection. This material is non-conducting. Where the article to be held is an RF aerial for a helicopter, and ribs are provided in the recess of the holder, the surfaces of the ribs can be bored out so that the ribs become conductive. As the aerial is gripped, an earth through the ribs is provided.

The recess may have a sleeve-like liner of, for example, PTFE.

I claim:

1. A latching holder for engaging an article, the holder comprising:
    first and second co-acting members,
    said members defining a recess for receiving an article, said recess having first and second sides,
    said members being pivotally engaged on the first side of the recess; and
    releasable rotatable cam means on the second side of the recess, said cam means being operable to lock the first and second co-acting members together, said cam means comprising:
        a cam member having a part-circular cam surface rotatably mounted on said second member for rotation about a single longitudinal axis, and
        a recess on said first member having a corresponding part-circular cam surface for receiving the cam member, and wherein said first and second co-acting members are pivotally connected along an axis parallel to said longitudinal axis of the cam member.

2. A holder according to claim 1, wherein the part-circular cam surface on the cam member is convex and the part-circular cam surface on the recess is concave.

3. A holder according to claim 1, including a locking arm pivotally mounted on one of the co-acting members, said rotatable cam means being rotated by said locking arm.

4. A holder according to claim 2, including a locking arm pivotally mounted on one of the co-acting members, said rotatable cam means being rotated by said locking arm.

5. A holder according to claim 3, including locking means for locking the locking arm in a locked position.

6. A holder according to claim 4, including locking means for locking the locking arm in a locked position.

7. A holder according to claim 1, wherein the holder and recess are elongate for receiving an elongate article.

8. A holder according to claim 1, wherein the recess has a circular cross-section for receiving a tubular article.

9. A holder according to claim 1, wherein the recess has an elliptical shape.

10. A holder according to claim 1, wherein the recess has longitudinal ridges.

11. A holder according to claim 1, wherein the recess has a liner.

12. A holder according to claim 1 further including a pivot pin for pivotally securing the first and second co-acting members together.

13. A holder according to claim 12 including a locking arm pivotally mounted on one of the co-acting members and having a recess for engaging the pivot pin.

* * * * *